Patented Feb. 25, 1941

2,232,735

UNITED STATES PATENT OFFICE 2,232,735

SATURATED DEGRADATION PRODUCTS OF STEROLS AND A METHOD OF PRODUCING THE SAME

Walter Schoeller and Arthur Serini, Berlin, and Max Gehrke, Birkenwerder, near Berlin, Germany, assignors, by mesne assignments, to Schering Corporation, Bloomfield, N. J., a corporation of New Jersey No Drawing. Application September 19, 1935, Serial No. 41,252. In Germany September 29, 1934

13 Claims. (Cl. 260—397)

This application is a continuation in part of the copending application Serial No. 41,202 and relates to the manufacture of therapeutically valuable degradation products of sterols and more particularly of those degradation products which still contain the cyclopentano polyhydro phenanthrene nucleus of the sterols in their molecule.

The process of the said copending application Serial No. 41,202 comprises treating unsaturated sterols, i. e. sterols which have at least one double bond in their cyclopentano polyhydro phenanthrene nucleus, with oxidizing agents whereby neutral unsaturated polycyclic ketones are produced which still contain the cyclopentano polyhydro phenanthrene nucleus of the sterol in their molecule.

The process of the present invention comprises treating saturated sterols, i. e. sterols having no double bond in their cyclopentano polyhydro phenanthrene nucleus, with oxidizing agents whereby neutral saturated polycyclic ketones are produced which still contain the cyclopentano polyhydro phenanthrene nucleus of the sterols in their molecule.

Another object of the present invention is to provide a method whereby the neutral saturated polycyclic ketones produced by the oxidation of said saturated sterols are separated from the reaction mixture.

Furthermore it is an object of the present invention to provide a method whereby from the neutral saturated polycyclic ketones produced by the oxidation of said saturated sterols and separated from the oxidation mixture, individual compounds are obtained.

A still further object of this invention consists in the conversion of the saturated hydroxy ketones obtained into valuable compounds by hydrogenation whereby the keto group is reduced to a secondary alcohol group.

Various other objects and advantages of the invention will appear as the description proceeds.

The valuable degradation products obtainable according to the present invention contain substantially substances which correspond more particularly to the structural formula

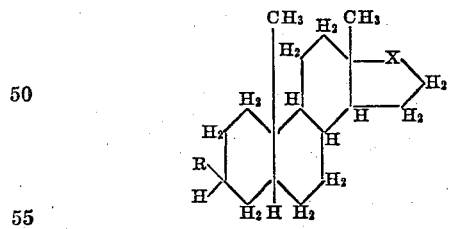

wherein R indicates —OH or a group which, upon hydrolysis, is converted into a hydroxy group,
such as O-acyl, O-alkyl, O-aryl or halogen, and X either

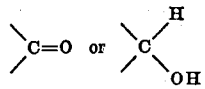

Thus, for instance, from the neutral oxidation products of the reaction mixture an androstanolone or its derivatives of the general formula $C_{19}H_{29}OR$ and the structural formula

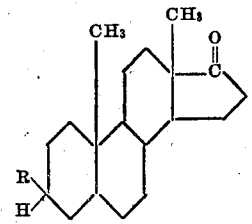

(R as above) can be obtained, and this hydroxy ketone can further be converted by hydrogenation into a dialcohol, an androstandiol or its derivative of the general formula $C_{19}H_{31}OR$ and the structural formula

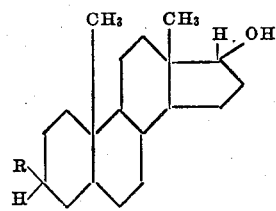

(R as above).

As starting materials for the present invention saturated sterols are used which contain no double bond in their cyclopentano polyhydro phenanthrene nucleus, as, for instance, koprosterol, dihydrocholesterol in their various isomer modifications and the hydrogenation products derived from other sterols, such as from phytosterol, stigmasterol, sitosterol, cinchol or the like provided that they do not contain a double bond in their cyclopentano phenanthrene nucleus.

According to the present invention the degradation of these sterols is effected by oxidizing agents which are capable of splitting up —C—C— bonds, as, for example, chromium trioxide, permanganates or the like, the present invention being based on the fact that the long side chain of the sterol molecule is broken down by the oxidation process. This oxidation procedure takes place in suitable solvents. Thereby it is advisable to protect from oxidation the hydroxy group present in the cyclopentano polyhydro phenanthrene nucleus of the sterols. This is achieved by converting the hydroxy group into a group which on hydrolysis or saponification can be reconverted into the hydroxy group, such as the —O-acyl, —O-alkyl, —O-aryl, halogen group.

The neutral fraction of the oxidation mixture is separated from the acid reaction products by a suitable treatment, such as with an alkaline agent forming removable salts.

From the separated neutral fraction the unreacted starting material can be separated and the valuable neutral saturated polycyclic ketones can be isolated in various ways.

The isolation can be effected, for example, by making use of the different solubility of the various products of the neutral fraction in suitable solvents, i. e. by means of fractional crystallisation or precipitation. Thus, the separation of the hydroxy ketones on the basis of the different solubility of their esters has proved of value. A further isolation method consists in subjecting the neutral fraction to distillation or sublimation in a high vacuum.

The ketones produced by the claimed process may also be separated and isolated from the oxidation mixture by combination with compounds capable of forming substances of different solubility. Thus, use is made of the different solubility properties of the ketone derivatives obtained on the precipitation of the neutral portion with ketone reagents, for example, with semicarbazide, thiosemicarbazide, phenylhydrazine and the like.

These isolating and separating methods are described more in detail in the above mentioned copending application. They can be employed alone as such; advantageously, however, they are combined together in a suitable manner.

The hydrogenation of the hydroxy ketones obtained into valuable hydrogenation products is carried out by subjecting said compounds or their derivatives to the action of agents which are capable of reducing the keto group to a secondary alcohol group, thereby forming the corresponding dialcohols.

The following examples serve to illustrate the invention without, however, limiting the same to them:

*Example 1*

Cholesterol is hydrogenated with hydrogen and platinum black to $\beta$-cholestanol according to Willstätter and Mayer (B. 41, p. 2199) and afterwards acetylated. 50 grams of the so obtained $\beta$-cholestanol acetate are dissolved in 1,000 grams of glacial acetic acid while warming, and mixed, during the course of 2 hours while stirring, with 100 grams of chromic acid anhydride in 1,000 grams acetic acid. The reaction mixture is poured on 5 kilograms of ice and the precipitate taken up with ether. The ethereal solution is washed free from acid by means of dilute soda solution. The residue obtained after evaporation of the ether is steam distilled until no more volatile constituents pass over. The residue is treated with semicarbazide. The precipitated semicarbazones (2 grams, melting point of impure substance about 250° C.) are purified by crytallisation from alcohol. From the product obtained by splitting these semicarbazones with dilute, alcoholic sulphuric acid, a hydroxy ketone having the trans steric configuration and of the melting point 172° and the general formula $C_{19}H_{30}O_2$ can be isolated. Yield about 1 gram.

*Example 2*

50 grams of cholestanol benzoate are dissolved in 2,000 ccs. of glacial acetic acid and oxidised by reacting with a solution of 80 grams of chromic acid anhydride in acetic acid on a water bath. The reaction mixture is then diluted with water and extracted with ether. After separating the ether residue into an acid and a neutral fraction, the latter is recrystallised from alcohol, whereby unchanged starting material remains undissolved and is removed. By the addition of semicarbazide acetate solution a semicarbazone of the benzoate of the hydroxy ketone is precipitated from the alcoholic mother liquor and the hydroxy ketone benzoate is obtained by careful splitting the condensation products. On saponification, the ester yields a hydroxy ketone of the general formula $C_{19}H_{30}O_2$ which on recrystallisation has a melting point of 172°.

1 gram of this hydroxy ketone is dissolved in 50 ccs. of glacial acetic acid and is treated with hydrogen in the presence of 0.2 gram of platinum oxide catalyst and a small amount of mineral acid until one mol of hydrogen has been taken up. After hydrogenation the solution is filtered free from catalyst and poured into water. The mixture is extracted with ether and the ether residue saponified with alcoholic alkaline lye. The reaction liquid is again poured into water and extracted with ether. The ether residue can be purified by crystallisation from dilute alcohol, ethyl acetate or similar solvents. The melting point of the trans-androstandiol of the general formula $C_{19}H_{32}O_2$ thus obtained is approximately 162° C.

*Example 3*

50 grams of sitostanol acetate, melting point 132° C. (for method of preparation see Zeitschrift für physiologische Chemie, vol. 101, p. 231) are oxidised with chromic acid anhydride in acetic acid solution in the same manner as described in Example 1. Thereby the semicarbazone of the melting point 262° C. and from this the hydroxy ketone of the melting point 172° C. is obtained; the yield being about the same as in Example 1.

*Example 4*

20 grams of ergostanol acetate, melting point 145° C. (for method of preparation, see Annalen, vol. 452, p. 45 (1927); Annalen, vol. 460, p. 234 (1928)) are oxidised according to Example 1. The yield of the hydroxy ketone of the melting point 172° C. is as in Example 1.

*Example 5*

The acetate of $\gamma$-cholestanol (for the method of preparation see Berichte, vol. 49, p. 1724, 1916) is oxidised according to Example 1. On addition of semicarbazide acetate solution a mixture of semicarbazones is obtained with an indefinite melting point of about 250° C. which on hydrolysis yields a mixture of hydroxy ketones of the general formula $C_{19}H_{30}O_2$.

From this mixture the various isomers of the general formula $C_{19}H_{30}O_2$ can be isolated in a suitable manner.

*Example 6*

100 grams of cholestanol benzoate are dissolved in 4.5 liters of glacial acetic acid on a water bath, and are oxidised with a solution of 150 grams of chromic acid anhydride in 0.5 liter of acetic acid. The greater part of the glacial acetic acid is distilled off under reduced pressure, the residue poured into water and extracted with ether. The ethereal solution is first shaken with acid and water and then with alkali and water. The neutral part of the reaction products still remains in the ether. After evaporation of the ether, the neutral part (about 12 grams) is treated with petroleum ether whereby the non-oxidised cholestanol benzoate goes into solution; the benzoate of the hydroxy ketone $C_{19}H_{30}O_2$ remains and is purified by crystallisation from alcohol and chloroform or benzine. The melting point of the pure benzoate is about 215° C., from which by saponification the hydroxy ketone $C_{19}H_{30}O_2$ of the melting point 172° C. is obtained. The yield is almost 1 gram.

*Example 7*

100 grams of cholestanol acetate are dissolved in a mixture of 3 liters of acetone and 2 liters of glacial acetic acid. To this solution there are gradually added, at 50–60° C., 280 grams of powdered potassium permanganate while thoroughly stirring. The stirring is further continued with warming, until the permanganate is consumed. The mixture is treated with sulphur dioxide to dissolve the manganese dioxide formed and the reaction mixture is then poured into water. The precipitate is filtered out and freed from acid oxidation products by treatment with 2% sodium hydroxide solution. The neutral portion is triturated with methyl alcohol; thereby the non-oxidised cholestanol acetate remains undissolved (about 35 grams). By evaporation of the methyl alcoholic solution, the neutral oxidation product is obtained as residue. From the latter, by reaction with semicarbazide acetate in alcoholic solution, a difficultly soluble semicarbazone of the melting point 262° C. is formed, from which the hydroxy ketone of the melting point 172° C. is obtained by splitting. The yield is about 0.2 gram.

*Example 8*

50 grams of α-cholestyl chloride (for preparation, see Zeitschrift für physiologische Chemie, vol. 145, page 181) are dissolved in 2,000 ccs. of glacial acetic acid and oxidised by treatment with a solution of 100 grams of chromic acid anhydride in 500 ccs. of acetic acid on a water bath while stirring. After 10 hours heating, the greater part of the solvent is distilled off under reduced pressure. The residue is poured into water and extracted with ether. The ethereal solution is treated successively with dilute sulphuric acid and dilute potassium hydroxide solution. After separating the potassium salts formed, the ethereal solution is evaporated to dryness. The residue is then steam distilled to remove volatile oxidation products. The residue remaining after steam distillation, is triturated with about 50 ccs. of alcohol. Thereby about 10 grams of unchanged α-cholestyl chloride remain undissolved; the alcoholic mother liquor is evaporated to dryness whereby about 6 grams of residue are obtained. The latter is heated with 30 grams of potassium benzoate and 90 grams of benzoic acid to 180° for 1½ hours. After cooling, the solid mass is taken up with hot alcohol, mixed with water and extracted with ether. The residue obtained from the ethereal solution is reacted in the usual way with an alcoholic solution of semicarbazide acetate, giving the semicarbazone of a hydroxy ketone benzoate. The latter yields the free hydroxy ketone by splitting and saponification. The yield amounts to about 0.5 gram of a hydroxy ketone of the general formula $C_{19}H_{30}O_2$ having a melting point of 181° C. 200 mg. of this hydroxy ketone of the general formula $C_{19}H_{30}O_2$ and the melting point of 181° C. are dissolved in 45 ccs. of n-propyl alcohol; to the solution, while boiling, sodium cut into small pieces is added as long as the metal is dissolved. The hot reaction mixture is poured into water and extracted with ether. After the ethereal solution has been washed and dried it is evaporated off and the residue is carefully sublimated in a high vacuum (0.001 mm. Hg) at 90–100° C. The sublimate is purified by recrystallisation in dilute acetone and dilute alcohol; thereby crystal needles are obtained which show a melting point of 219–223° and an optical rotation $$[\alpha]_D^{21°} = +12.6°$$

In the above examples many changes and variations may be made by those skilled in the art. Thus, in the place of compounds in which the hydroxy group is free or substituted by the O-acetyl or O-benzoyl group or by chlorine as in the above examples, substances may be used as starting materials for carrying out the various steps of the reactions in which the hydroxy group is replaced, for instance, by the O-succinyl or O-phthalyl, or any other O-acyl group, by the methoxy or ethoxy group or any other aroxy or alkoxy group or by other substituents which can be converted into the hydroxy group. The conversion of the esters or ethers into the corresponding hydroxy compound is effected by the known methods of saponification or hydrolysis while the transformation of the halogen substituent into the hydroxy group can be carried out, instead of working according to Example 8, by causing the halogen compound to react with salts or other organic carboxylic or sulfonic acids, such as silver acetate or the like. Thereby the esters are obtained which, on saponification, yield the corresponding hydroxy compounds.

The oxidation is preferably carried out by means of chromic acid anhydride; but, of course, other oxidation agents, such as other compounds of six-valent chromium, for instance, chromium oxychloride $CrO_2Cl_2$, bichromates in acid solution or the like, or potassium, calcium or other suitable permanganates and still others may be used, especially such agents as are capable of splitting up saturated —C—C bonds.

The amount of the various agents and the type and the amount of the solvents used in carrying out this invention may be varied within the limits known to those skilled in the art. For instance, instead of glacial acetic acid used in the above examples, carbon tetrachloride or other solvents or solvent mixtures can also be taken which are resistant against the oxidation agent used. Quite generally it appears that considerable dilution of the reaction mixture is of advantage in the oxidation procedure. As to the temperature it may be altered too according to the principles of the present invention.

For the hydrogenation of the oxidation products obtained, hydrogen may be used which is catalytically activated by noble metal catalysts, such as platinum or its oxides, or by nickel or any other known catalysts, such as for instance, the Raney catalyst (Jour.-Am. Chem. Soc., 54 (1932) page 4116). Furthermore, one may employ hydrogen in statu nascendi as produced, for instance, by the action of an alkali metal on alcohols or the like. The reduction can also be effected by heating the compounds to be reduced with substances capable of giving off hydrogen, such as, for instance, alcohols in the presence of alcoholates, or by causing the compounds to be reduced to react with such alkyl metal halides which are capable of forming olefines, such as for instance, isopropyl magnesium iodide and the like.

As to the separation, isolation, hydrolysis of condensation products, saponification, and purification of the reaction products obtained by the present invention, these steps of procedure can be varied to a wide extent as, for instance, described and explained in detail in the copending application No. 41,202.

Of course, various other modifications and changes in the reaction conditions, etc., may be made by those skilled in the art in accordance with the principles set forth herein and in the claims annexed hereto.

The progress made by the present invention consists in that therapeutically valuable products which exhibit the effects of the male sex hormones or are convertible into compounds of such properties and which up to the present time, if at all, could only be isolated in small quantities from urine, organs or the like, can now be produced synthetically from relatively readily obtainable sterols or sterol derivatives which contain no double bond in their polycyclic ring system. Thus, for instance, the saturated hydroxy ketone of the general formula $C_{19}H_{30}O_2$ and the melting point 172° C., the so-called trans- androsterone, as it is obtained, for instance, according to Example 1, has an activity of about 500 $\gamma$/C. U. whereas the saturated hydroxy ketone of the general formula $C_{19}H_{30}O_2$ and the melting point 181° C., the so-called androsterone or epi-androsterone, as it is obtainable, for instance, according to Example 8 or from the mixture mentioned in Example 5, has an activity of about 150 $\gamma$/C. U. On hydrogenating these hydroxy ketones there is produced from the trans-androsterone of the melting point 172° C. a dihydroxy compound of the general formula $C_{19}H_{32}O_2$ and the melting point 162° C., the so-called trans-androstandiol, having an activity of about 500 $\gamma$/C. U., whereas from the androsterone of the melting point of 181° C. a dihydroxy compound of the general formula $C_{19}H_{32}O_2$, the so-called epi-androstandiol, is obtainable by hydrogenation, which has a melting point of 219–223° C. and shows an activity of about 50 $\gamma$/C. U.

The esters, as for instance, the acetates or benzoates have an activity similar to that of the corresponding free alcohols but are distinguished from the free alcohols by the fact that their activity is distributed over a relatively longer period of time.

What we claim is:

1. Process for the production of neutral degradation products having a cyclopentano polyhydrophenanthrene nucleus comprising oxidizing sterols containing no double bond in their cyclopentano polyhydro phenanthrene nucleus with agents capable of splitting off the aliphatic side chain, separating the neutral portions of the resultant oxidation products, isolating from the latter the saturated polycyclic ketones formed by the oxidation and subjecting said saturated ketones to the action of hydrogenating agents.

2. Process for the production of neutral degradation products having a cyclopentano polyhydro phenanthrene nucleus, comprising oxidizing etherified sterols containing no double bond in their cyclopentano polyhydro phenanthrene nucleus with agents capable of splitting off the aliphatic side chain, and separating the neutral portions of the resultant oxidation products.

3. Process according to claim 1 wherein the saturated ketones are subjected to the action of catalytically activated hydrogen until one mol of hydrogen has been taken up.

4. Process according to claim 1 wherein the saturated ketones are subjected to the action of hydrogen in statu nascendi.

5. Process for the production of saturated ketones of the 10,13-dimethyl cyclopentano polyhydro phenanthrene series, comprising oxidizing a nuclearly saturated sterol of the general formula $C_{19}H_{31}OY$ and the structural formula

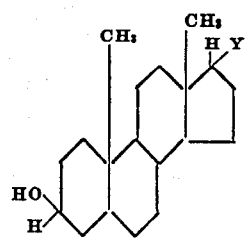

wherein Y represents an aliphatic side chain, with an oxidizing agent capable of splitting off the aliphatic side chain and introducing ketonic oxygen in the 17-position, and isolating the ketonic material formed by the oxidation.

6. Process for the production of saturated alcohols of the general formula $C_{19}H_{31}OR$ and the structural formula

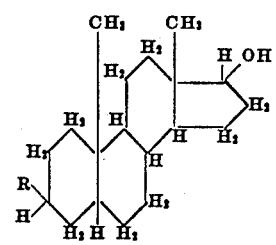

wherein R represents a member of the group consisting of the hydroxy group and groups which, on hydrolysis, are retransformed into the hydroxy group, comprising oxidizing sterol compounds of the general formula $C_{19}H_{30}RY$ and the structural formula

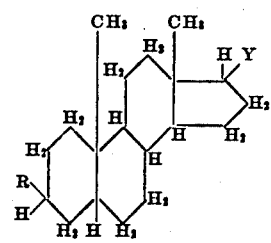

wherein Y represents an aliphatic side chain, with agents capable of splitting off the aliphatic side chain, separating the neutral portions of the resultant oxidation products, isolating from the latter the saturated polycyclic ketones formed by oxidation and subjecting the same to the action of hydrogenation agents.

7. A saturated alcohol comprising the trans form of the compound of the general formula $C_{19}H_{31}OR$ and the structural formula

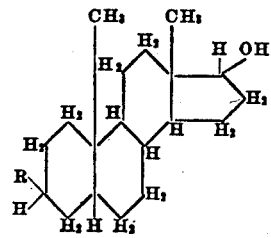

wherein R represents a member of the group consisting of the hydroxy group and groups which, on hydrolysis, are retransformed into the hydroxy group, said saturated product exhibiting a physiological activity attributed to the male sex hormones.

8. Process for the production of neutral products having a cyclopentano polyhydro phenanthrene nucleus comprising hydrogenating cholesterol to produce β-cholestanol, treating the β-cholestanol with an etherifying agent to convert the hydroxyl group to an ether group, and oxidizing the so protected compound with an agent capable of splitting off the side chain and introducing ketonic oxygen in the 17-position.

9. Process according to claim 5, wherein the starting compound is treated with an etherifying agent to convert the 3-OH group into an ether group prior to the oxidation.

10. Process for the production of neutral products having a cyclopentanopolyhydrophenanthrene nucleus comprising hydrogenating cholesterol and oxidizing the resulting product with an agent capable of splitting off the side chain, and then separating the ketonic reaction product so obtained.

11. An acyl derivative of trans-androstandiol.

12. Trans-androstandiol of the general formula $C_{19}H_{32}O_2$ and having a melting point of approximately 162° C.

13. An androstandiol having a melting point of 219–223° C.

WALTER SCHOELLER.
ARTHUR SERINI.
MAX GEHRKE.